US009140442B2

(12) United States Patent
Kim et al.

(10) Patent No.: US 9,140,442 B2
(45) Date of Patent: Sep. 22, 2015

(54) LOW-PROFILE ILLUMINATED SWITCH ASSEMBLY

(71) Applicant: Alps Electric Korea Co., Ltd., Gwangju (KR)

(72) Inventors: Seondong Kim, Gwangju (KR); Youngho Lee, Gwangju (KR)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 13/781,231

(22) Filed: Feb. 28, 2013

(65) Prior Publication Data

US 2013/0223042 A1 Aug. 29, 2013

(30) Foreign Application Priority Data

Feb. 29, 2012 (KR) ............................ 2012-0021301

(51) Int. Cl.

*H04M 1/22* (2006.01)
*F21V 33/00* (2006.01)
*H01H 9/18* (2006.01)
*H01H 23/02* (2006.01)

(52) U.S. Cl.

CPC ................ *F21V 33/00* (2013.01); *H01H 9/182* (2013.01); *H01H 23/025* (2013.01); *H01H 2219/062* (2013.01); *H01H 2300/01* (2013.01)

(58) Field of Classification Search

CPC .................. H01H 2219/054–2219/066; H01H 2009/183–2009/184; H01H 9/182; H01H 23/025; F21V 2200/00–2200/40; F21V 5/00–5/005; F21V 5/048

See application file for complete search history.

(56) References Cited

FOREIGN PATENT DOCUMENTS

JP 2007-308102 11/2007

OTHER PUBLICATIONS

English machine translation of JP 2007-308102 (Nishiyama et al).*
Office Action issued in corresponding Korean Patent Application No. 10-2012-0021301, mailed Jan. 23, 2013.

* cited by examiner

*Primary Examiner* — Mariceli Santiago
(74) *Attorney, Agent, or Firm* — Brinks Gilson & Lione

(57) ABSTRACT

The present invention relates to an illuminated switch assembly that includes a case; a circuit board disposed inside the case; a light-emitting diode mounted on the circuit board to emit light downward; a light-guiding member configured to transmit the light emitted downward by the light-emitting diode to a position above the circuit board; and an operation member disposed in an upper part of the case to be operable as a switch, the operation member being configured to be illuminated with light received from the light-guiding member.

7 Claims, 2 Drawing Sheets

LOW-PROFILE ILLUMINATED SWITCH ASSEMBLY

CLAIM OF PRIORITY

This application claims benefit of Korean Patent Application No. 2012-0021301 filed on Feb. 29, 2012, which is hereby incorporated by reference.

BACKGROUND OF THE INVENTION

1. Field of the Invention

The present invention relates to an illuminated switch assembly. In particular, the present invention relates to a low-profile illuminated switch assembly.

2. Description of the Related Art

Generally, a vehicle has various control switches in front of the driver's seat to control additional functions of the vehicle. Types of such control switches that have been mainly used include a lever type, a push-button type, and a rotary type. As an air-conditioner control switch, a control switch of combined type having both push and rotary functions has been often used particularly in recent years.

When a vehicle having such a combined-type switch drives at night, an illumination structure is used in which when the vehicle's interior lighting is turned on, light is emitted by an internal LED for illumination and passes through a lens for illumination to reach a push button, so that a symbol printed on the push button is illuminated with the light.

Korean Patent No. 0721236 discloses a technique related to a two-point illuminated rotary switch.

The related art described above provides a combined-type rotary switch mounted to a connector terminal of an audiovisual (AV) electric device and configured to emit an operation signal by being pressed or rotated. The combined-type rotary switch includes a rotary switch housing connected to the connector terminal; a switch knob made of transparent material, and inserted in the rotary switch housing to support components sequentially fitted therein; a serration lens fitted in the switch knob, and having serrations formed at a light incident portion and a rim to allow light from many LEDs serving as light sources to travel in straight lines and bend; a transparent lens made of transparent material and configured to surround the rotary switch housing; a handle made of translucent material, and having the transparent lens inserted therein to be illuminated through the transparent lens; and a push button fitted in the handle and configured to move the switch knob, when pressed, to operate a switch on a printed circuit board (PCB) having the LEDs mounted thereon.

In the related art described above, it is inevitable to use a double-sided mounting structure in which components are mounted on the lower side of the PCB and LEDs are mounted on the upper side of the PCB. The double-sided mounting structure is inconvenient in that it makes the design process complicated, inevitably requires development of a program for driving the PCB, and involves an enormous cost.

Also in the related art, it is necessary to secure a large separation space between components to avoid interference with the LEDs mounted on the upper side of the PCB. The space usability is thus degraded, and the related art cannot be applied if the separation space between the PCB and components disposed above the PCB is narrow.

SUMMARY OF THE INVENTION

The present invention solves the problems of the related art by providing an illuminated switch assembly in which light from an LED mounted on a circuit board to emit light downward is refracted horizontally and vertically to reach a position above the circuit board, and thus a space above the circuit board can be used, a plurality of illuminated regions can be simultaneously illuminated with light from the single LED, and the brightness of the plurality of illuminated regions connected to the LED can be simultaneously adjusted by adjusting the brightness of the LED.

The present invention provides an illuminated switch assembly including a case; a circuit board disposed inside the case; an LED mounted on the circuit board to emit light downward; a light-guiding member configured to transmit the light emitted downward by the LED to a position above the circuit board; and an operation member disposed in an upper part of the case to be operable as a switch, the operation member being configured to be illuminated with light received from the light-guiding member.

The circuit board may be disposed with the mounting surface thereof facing downward. The operation member may have a symbol illuminated portion.

The circuit board may have at least one through hole, through which the light-guiding member may extend from below to above the circuit board.

The light-guiding member may include a light input portion that faces the LED to receive light from the LED; and a light branching portion that extends from the light input portion, bends to extend horizontally, and further bends to extend vertically.

More than one light branching portion may be connected to the light input portion.

A switch contact portion of the operation member may be located between the circuit board and the operation member; and an elastic member may be disposed between the circuit board and the switch contact portion.

According to the present invention, it is possible to mount an LED on the circuit board such that the LED emits light downward, realize a compact layout of the illuminated switch assembly, and use a space above the circuit board. Even if a separation distance between the circuit board and a component (such as the operation member) disposed above the circuit board is narrow, the illuminated switch assembly of the present invention can be provided.

The problems of the related art can be solved when the lower surface of the circuit board serves as the mounting surface. Additionally, a plurality of illuminated regions can be illuminated with light from the single LED. The brightness of the plurality of illuminated regions (symbol illuminated portions) connected to the single LED can be simultaneously adjusted by simply adjusting the brightness of the LED. It is thus possible to provide the effect of simplifying the circuit management.

DESCRIPTION OF THE PREFERRED EMBODIMENTS

Preferred embodiments of the present invention will now be described in detail with reference to the attached drawings.

Figure 1:
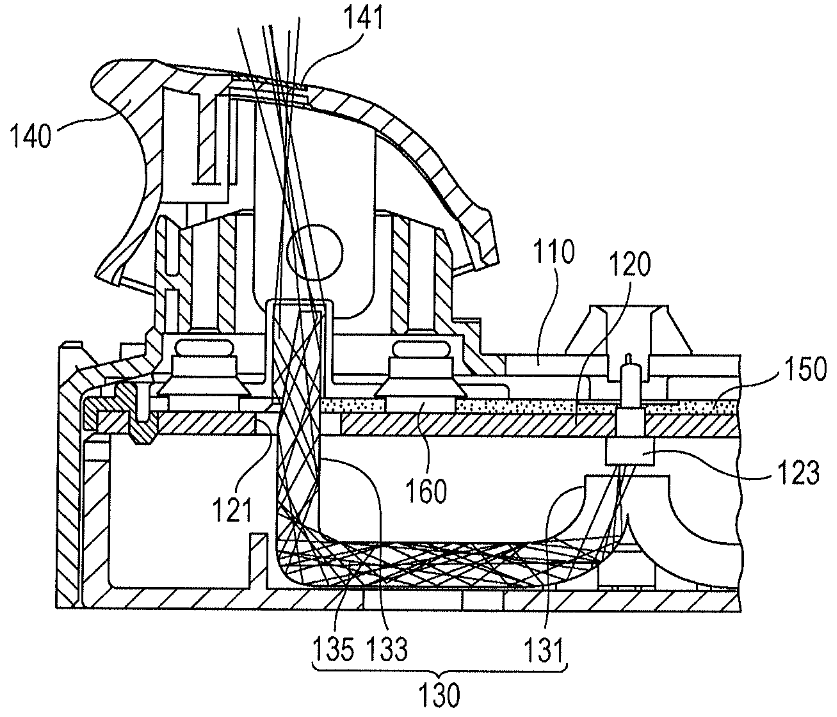
FIG. 1 is a cross-sectional view illustrating a structure of an illuminated switch assembly according to the present invention.

FIG. 1 is a cross-sectional view illustrating a structure of an illuminated switch assembly according to the present invention.

As illustrated in FIG. 1, the illuminated switch assembly according to the present invention mainly includes a case 110, a circuit board 120, an LED 123, a light-guiding member 130, and an operation member 140.

The operation member 140 is, for example, a switch member including a switch knob. To allow the user to operate even in dark places, the operation member 140 is configured to be illuminated with light emitted from the LED 123. The operation member 140 illustrated in FIG. 1 is a switch member for operating a power window of a vehicle door. The operation member 140 of FIG. 1 is configured such that when the user presses the switch knob, a switch contact portion 160 performs a switching operation to give an operation signal to a control circuit (not shown) on the circuit board 120, and thereby drives a motor (not shown) for opening or closing the vehicle window. The present specification does not describe in detail the configuration of the operation member 140, as various embodiments of the operation member 140 may be made by those skilled in the art. Types of the operation member 140 that can be used include, but are not limited to, a lever type, a push-button type, a rotary type, and a combined type having both push and rotary functions. The illuminated switch assembly of the present invention is applicable regardless of the type of the operation member 140, as long as the operation member 140 can be illuminated. The case 110 may be of either independent type or attached type, such as a switch box for a vehicle.

The circuit board 120 may be disposed inside the case 110, with the mounting surface thereof facing downward.

In the present specification, the term "upper" or "upward" refers to the position or direction in which the operation member 140 is disposed in the illuminated switch assembly, and the term "lower" or "downward" refers to the position or direction opposite that in which the operation member 140 is disposed.

The circuit board 120 may be a single-sided mounting board instead of, for example, a double-sided mounting board. The circuit board 120 may be disposed with the mounting surface thereof facing downward.

For example, a PCB or a printed wiring board (PWB) may be used as the circuit board 120.

The PCB refers to one that is obtained by placing and soldering components, such as a resistor, a capacitor, a coil, a transistor (TR), an integrated circuit (IC), a large-scale integrated circuit (LSI), and a switch, onto a PWB to complete a circuit function. The PWB refers to one that is obtained by forming a wiring pattern of copper foil on a copper clad laminate by, for example, etching. The wiring pattern is based on circuit design and represents electrical wiring that connects circuit components. The PWB is provided with both wiring and components mounted thereon.

The LED 123 is mounted on the circuit board 120. The LED 123 is mounted, together with electrical components, on the lower surface of the circuit board 120. Light from the single LED 123 is transmitted through the light-guiding member 130 to a position above the circuit board 120.

The light-guiding member 130 is disposed to face the LED 123.

The light-guiding member 130 receives light emitted from the LED 123 and transmits the light to a position above the circuit board 120. The light-guiding member 130 may be configured to have a substantially U shape with one shorter leg, as viewed from one side.

A type of optical waveguide configured to be capable of efficiently transmitting optical signals is used as the light-guiding member 130. For example, the light-guiding member 130 may be made of quartz. As illustrated in FIG. 1, light emitted from the LED 123 travels while being refracted and/or reflected inside the light-guiding member 130 to form a plurality of optical paths 135. The optical paths 135 illustrated in FIG. 1 are merely an example. Other optical paths not shown in FIG. 1, or different from those in FIG. 1, may be formed inside the light-guiding member 130.

Figure 2:
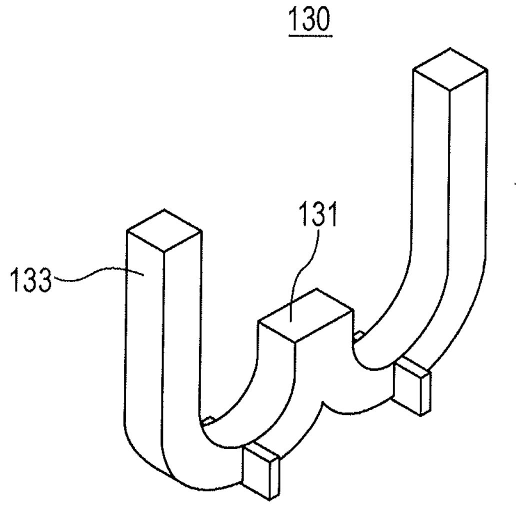
FIG. 2 is a perspective view illustrating a first embodiment of a light-guiding member according to the present invention.
Figure 3:
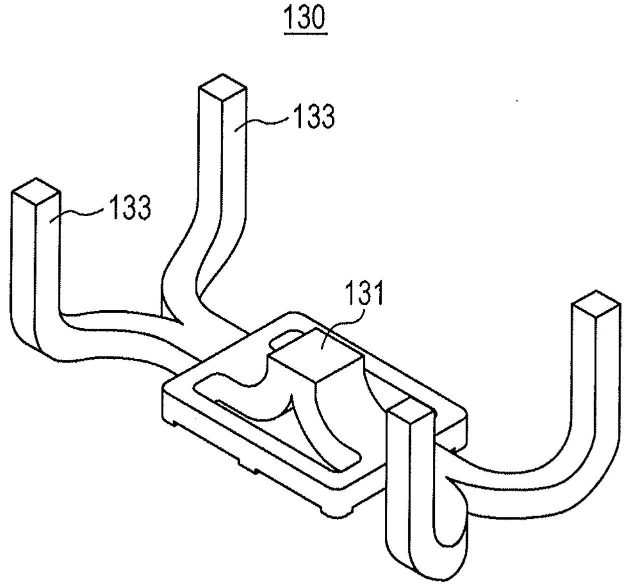
FIG. 3 is a perspective view illustrating a second embodiment of the light-guiding member according to the present invention.

FIG. 2 is a perspective view illustrating a first embodiment of the light-guiding member 130 according to the present invention. FIG. 3 is a perspective view illustrating a second embodiment of the light-guiding member 130 according to the present invention.

Referring to FIG. 2 and FIG. 3, the light-guiding member 130 may include a light input portion 131 and a light branching portion 133. The light input portion 131 faces the LED 123 to receive light from the LED 123. The light branching portion 133 extends from the light input portion 131, bends to extend horizontally, and further bends to extend vertically.

As illustrated in FIG. 2 and FIG. 3, a plurality of light branching portions 133 may be connected to the light input portion 131 to provide a plurality of illuminated regions.

FIG. 2 illustrates an example where the light branching portions 133 are disposed on both sides of the light input portion 131. FIG. 3 illustrates an example where the light branching portions 133 are disposed in four directions around the light input portion 131. More than four light branching portions 133 may be disposed around the light input portion 131.

The light branching portions 133 are configured to bend to extend upward. The circuit board 120 may have a through hole 121, through which the light-guiding member 130 may extend from below to above the circuit board 120.

The operation member 140 operable as a switch is disposed in an upper part of the case 110.

The operation member 140 may have a symbol illuminated portion 141 illuminated with light received from the light-guiding member 130. The symbol illuminated portion 141 presents a symbol that allows the user to intuitively recognize the operation of the operation member 140. For example, if the operation member 140 includes a switch knob for operating a power window, upward and downward arrows indicating upward and downward operations of the power window can be presented by the symbol illuminated portion 141. The symbol illuminated portion 141 may be configured in various embodiments. For example, the symbol illuminated portion 141 may be made of transparent material that simply allows transmission of light from the LED 123, or may be made of material that allows transmission of light from the LED 123 while varying the color of the light.

The switch contact portion 160 may be disposed between the circuit board 120 and the operation member 140 to emit a contact signal in response to the operation of the operation member 140.

An elastic member 150 may be disposed between the circuit board 120 and the switch contact portion 160 to elastically support the switch contact portion 160. The elastic member 150 is made of elastic material, such as rubber or urethane resin. The material of the elastic member 150 is not particularly limited, as long as the elastic member 150 can elastically support the switch contact portion 160.

During operation of the operation member 140, the elastic member 150 elastically supports the switch contact portion 160 to provide a restoring force. The operational feeling of the operation member 140 can thus be improved.

Figure 4:
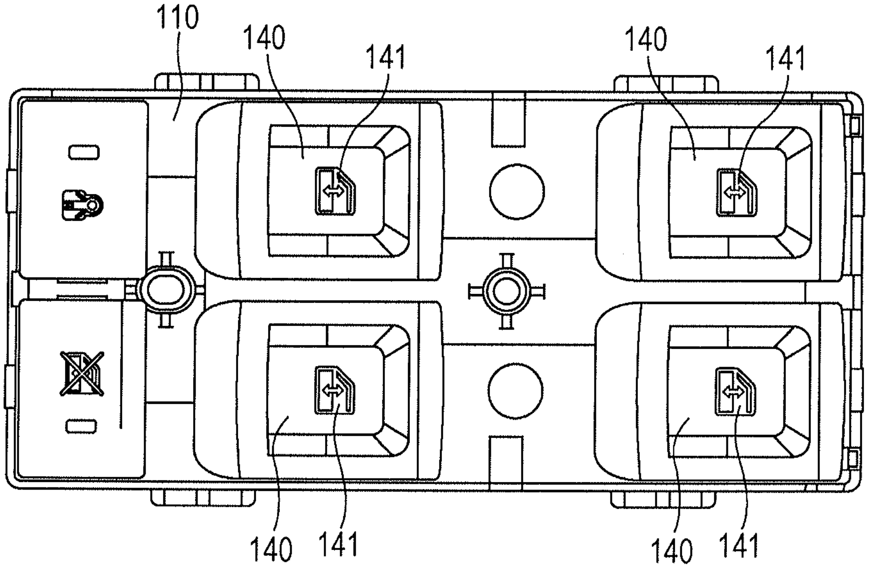
FIG. 4 is a plan view illustrating an example where the illuminated switch assembly according to the present invention is applied to a vehicle window switch.

FIG. 4 is a plan view illustrating an example where the illuminated switch assembly according to the present invention is applied to a vehicle window switch. As illustrated, the illuminated switch assembly of the present invention can be effectively used in a structure, such as a vehicle window switch, that includes a plurality of operation members 140.

In the present invention having the configuration described above, the LED 123 and the light-guiding member 130 are disposed below the circuit board 120. It is thus possible to reduce the space between the circuit board 120 and the operation member 140. Also, since the circuit board 120 can be configured as a single-sided mounting board instead of a double-sided mounting board, it is possible to solve the problems of design constraints in the double-sided mounting board of the related art.

Additionally, since a plurality of symbol illuminated portions 141 of the operation members 140 can be illuminated with light from the single LED 123, the unit price of the illuminated switch assembly can be reduced. The brightness of a plurality of illuminated regions (symbol illuminated portions 141) connected to the single LED 123 can be simultaneously adjusted by adjusting the brightness of the LED 123. This is advantageous in that the circuit management can be simplified.

Embodiments of the present invention have been described with reference to the attached drawings. It should be understood by those having ordinary knowledge in the technical field of the present invention that the present invention can be carried out in other specific forms without changing its technical idea or essential features. For example, by changing the material or size of each component part in accordance with the field of application, or by appropriately combining or replacing the embodiments, those skilled in the art can carry out the present invention in forms not specifically disclosed in the embodiments of the present invention, again, without departing from the scope of the present invention. Therefore, the embodiments described above are illustrative in any sense and should not be understood as being restrictive. Such modified embodiments should be considered as being within the scope of the technical idea described in the claims of the present invention.

What is claimed is:

1. An illuminated switch assembly comprising:

a case;

a circuit board disposed inside the case;

a light-emitting diode mounted on the circuit board to emit light downward;

a light-guiding member disposed under the circuit board and configured to transmit the light emitted downward by the light-emitting diode to a position above the circuit board; and an operation member disposed in an upper part of the case to be operable as a switch, the operation member being configured to be illuminated with light received from the light-guiding member.

2. The illuminated switch assembly according to claim 1, wherein the circuit board is disposed with the mounting surface thereof facing downward.

3. The illuminated switch assembly according to claim 1, wherein the operation member has a symbol illuminated portion.

4. The illuminated switch assembly according to claim 1, wherein the circuit board has at least one through hole, through which the light-guiding member extends from below to above the circuit board.

5. The illuminated switch assembly according to claim 1, wherein the light-guiding member includes a light input portion that faces the light-emitting diode to receive light from the light-emitting diode; and a light branching portion that extends from the light input portion, bends to extend horizontally, and further bends to extend vertically.

6. The illuminated switch assembly according to claim 5, wherein more than one light branching portion is connected to the light input portion.

7. The illuminated switch assembly according to claim 1, wherein a switch contact portion of the operation member is located between the circuit board and the operation member; and an elastic member is disposed between the circuit board and the switch contact portion.

* * * * *